United States Patent
Yon et al.

(10) Patent No.: US 10,111,306 B1
(45) Date of Patent: Oct. 23, 2018

(54) CONTROL SYSTEM FOR USER-ACTIVATED SELECTION OF CONTROL FUNCTIONALITY

(71) Applicant: General Electric Company, Schenectady, NY (US)

(72) Inventors: Jeremy Wayne Yon, Lyndhurst, OH (US); Timothy Lawrence Miller, Solon, OH (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 0 days.

(21) Appl. No.: 15/706,816

(22) Filed: Sep. 18, 2017

(51) Int. Cl.
*H05B 37/00* (2006.01)
*H05B 37/02* (2006.01)
*H04Q 9/00* (2006.01)

(52) U.S. Cl.
CPC ............ *H05B 37/0245* (2013.01); *H04Q 9/00* (2013.01); *H05B 37/0218* (2013.01); *H05B 37/0227* (2013.01); *H05B 37/0272* (2013.01); *H04Q 2209/40* (2013.01)

(58) Field of Classification Search
CPC ............ H05B 37/0227; H05B 37/0218; H05B 37/0272; H05B 37/0245; H05B 37/0281; H05B 33/0854; H05B 33/0845; H05B 33/0872; H05B 37/02; H05B 33/0857; H05B 33/0815; H05B 33/0827; H05B 33/0884
See application file for complete search history.

(56) References Cited

U.S. PATENT DOCUMENTS

| 9,006,996 | B2 | 4/2015 | Mohan et al. |
| 2009/0278479 | A1 | 11/2009 | Platner et al. |

FOREIGN PATENT DOCUMENTS

| WO | 09001267 A1 | 12/2008 |

*Primary Examiner* — Monica C King
(74) *Attorney, Agent, or Firm* — Peter DiMauro; GE Global Patent Operation

(57) ABSTRACT

A lighting control system includes control devices each configured to be coupled with one or more lighting devices. Each of the control devices includes sensor(s) configured to measure a characteristic of an environment, and hardware circuitry configured to connect with a network for one or more of remotely controlling operation of the one or more lighting devices, communicating the characteristic that is sensed, or monitoring information received through the network. The hardware circuitry of the control devices are configured to operate between different operational modes to perform different functions to control the one or more lighting devices based on the characteristic that is measured by the one or more sensors, based on the information received via the network, or based on both the characteristic that is measured and the information received via the network. The system also includes switching hardware configured to change the operational mode of the control devices.

20 Claims, 2 Drawing Sheets

CONTROL SYSTEM FOR USER-ACTIVATED SELECTION OF CONTROL FUNCTIONALITY

BACKGROUND

Various commonly used electronic devices are being replaced and/or upgraded to have expanded functionality. For example, previous relatively simple electronic devices such as light switches and dimmers, garage door openers, thermostats, and the like, are being replaced with switches, dimmers, openers, thermostats, and the like, that provide functionality beyond the respective simple functions of turning on or off lights, dimming lights, opening or closing garage doors, changing room temperatures, and the like. The expanded functionality can include sensing motion, communicating with mobile phones or computer tablets via one or more computer communication networks, communicating with other electronic devices, and the like, in order to monitor activity at or near the devices, coordinate operation of the device with other devices, etc.

But, not all users initially employ the expanded functionality of these devices upon first purchase or installation of the devices. A purchaser of a lighting device that generates light and also performs another function (e.g., motion or ambient light sensing, network communication, etc.) may not initially want to use the other function due to the additional functionality requiring hardware additional devices that operate based on the additional function. For example, the purchaser may have only a single lighting device, and may not have multiple lighting devices that communicate with each other via a wireless network. Another problem can arise when the expanded functionality of one device is incompatible with another device and/or a control unit for the devices.

BRIEF DESCRIPTION

In one embodiment, a lighting control system includes two or more control devices each configured to be coupled with one or more lighting devices. Each of the control devices includes one or more sensors configured to measure a characteristic of an environment, and hardware circuitry configured to connect with a network for one or more of remotely controlling operation of the one or more lighting devices, communicating the characteristic that is sensed, or monitoring information received through the network. The hardware circuitry of the control devices are configured to operate between different operational modes to perform different functions to control the one or more lighting devices based on the characteristic that is measured by the one or more sensors, based on the information received via the network, or based on both the characteristic that is measured and the information received via the network. The system also includes switching hardware configured to change the operational mode of the control devices.

In one embodiment, a system includes control devices each configured to be coupled with one or more lighting devices. Each of the control devices is configured to switch between operational modes that include a first operational mode involving receiving a characteristic measured by one or more sensors, a second operational mode involving connecting with a computer network for remotely controlling operation of the one or more lighting devices, and a third operational mode involving both receiving the characteristic that is measured by the one or more sensors and remotely controlling the operation of the one or more lighting devices based on the characteristic that is measured. The system also includes switching hardware configured to change the operational mode of the control devices.

In one embodiment, a method includes controlling one or more functions in a first set of functions using circuitry of an assembly, determining whether switching hardware has been intentionally actuated to change an operational mode of the circuitry from a first operational mode to a different, second operational mode, and controlling one or more different functions in a different, second set of functions using the circuitry of the assembly responsive to determining that the switching hardware has been intentionally actuated. The circuitry is configured to perform only the first set of functions while in the first operational mode and the circuitry is configured to perform both the first and second set of functions while in the second operational mode.

BRIEF DESCRIPTION OF THE DRAWINGS

The present inventive subject matter will be better understood from reading the following description of non-limiting embodiments, with reference to the attached drawings, wherein below.

DETAILED DESCRIPTION

The inventive subject matter described herein provides control devices or assemblies having plural different operational modes. The current operational mode of the devices can be switched or otherwise selected by an authorized user. The switching process disables one set of functionalities or functions, and enables a different set of functionalities of functions. Optionally, switching from one operational mode (associated with a first set of functions) to a different operational mode can allow the devices to perform both the first set of functions and at least a different, second set of functions. The hardware of the devices can be configured to perform both sets of functions at the outset (e.g., upon manufacture, acquisition, purchase, installation, or activation), but one set of functions may be unavailable or deactivated in one operational mode.

The devices and method satisfy completely different types of platforms or control schemes, and the ability to switch between them with a harmonized set of components to reduce or minimize cost. The switching process can include disabling incompatible functionality and enabling new functionality depending on the selected scheme. With the current proliferation of incompatible control systems and wide-spectrum of needs from users, the inventive subject matter described herein can avoid the user from being forced to select one platform, system, and/or control scheme for the product and for future expansion of the system that includes the product. The switching process enables user choice in addressing unique situational needs while keeping the costs reasonably optimized. From a technical perspective, having two platforms provides for two pathways of future development compounded with an opportunity to update the device in the field results in a more robust system for meeting needs, troubleshooting, and upgrading. Optionally, the devices and method can provide for a fully parallel system where both systems (having different sets of functionalities) are fully executed at the outset. Alternatively, a single system can simultaneously address multiple platforms with the different sets of functions.

Figure 1:
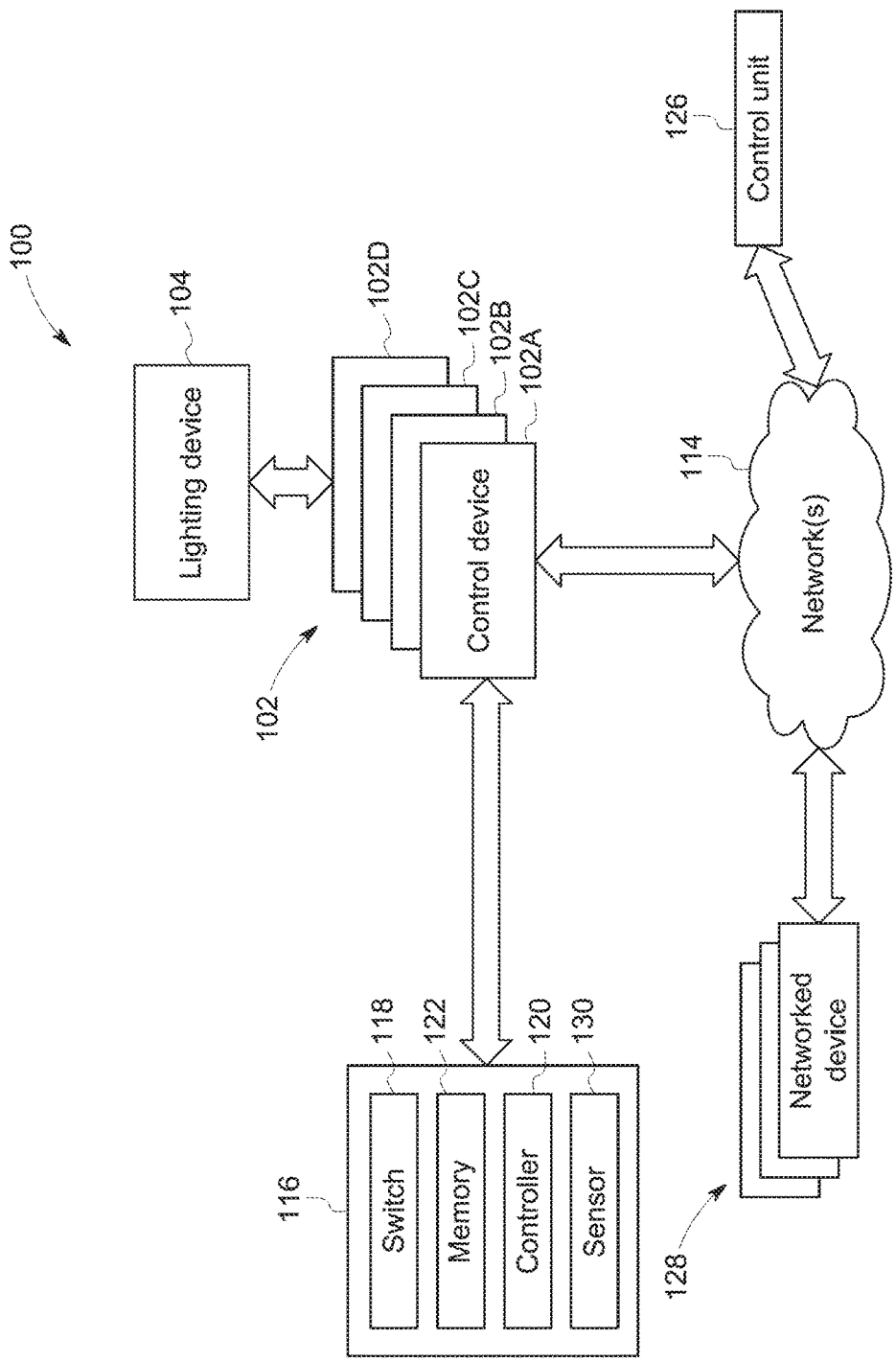
FIG. 1 illustrates one embodiment of a control assembly for user-activated selection of control functionality.

FIG. 1 illustrates one embodiment of a lighting control system 100 for user-activated selection of control functionality provided by different devices 102. The system 100 includes two or more control devices 102 (e.g., devices 102A-D in FIG. 1, although the system 100 can include a different number of devices 102) that operate to control or implement various functionalities, including control of a lighting device 104 (e.g., a device that generates light, such as a light emitting diode, incandescent bulb, etc.). One or more (or each) of the control devices 102 represent hardware circuitry that includes and/or is connected with one or more computer processors (e.g., one or more than one microprocessor, field programmable gate array, microcontroller, integrated circuit, etc.).

The control devices 102 can operate to perform a wide variety of functionalities. In one embodiment, the control device 102A can include or represent a driver that controls the conduction of current to the lighting device 104 to dictate when the lighting device 104 is active (e.g., generating light), when the lighting device 104 is not active (e.g., not generating light), and/or the amount of light generated by the lighting device 104. The control device 102B can include or represent an occupancy sensor that detects when one or more persons or objects are located within a field of view of the sensor. For example, the control device 102B can include a motion detector, infrared detector, camera, etc., that detects the presence or entry of a person in or into a room.

The control device 102C can include or represent a light sensor that measured or detects a level of ambient light. For example, the control device 102C can include one or more photodetectors that measure an amount of ambient light in a room, which optionally can be used to detect daylight or nighttime conditions. The control device 102D can include or represent an acoustic sensor, such as a microphone, that detects sounds. Optionally, one or more of the control devices 102A-D (or one or more additional control devices 102) can include or represent a temperature sensor such as a thermometer, thermocouple, or the like, for measuring temperatures (e.g., in a room). One or more of the control devices 102 can include or represent a humidity sensor that measures a level or amount of moisture in the air in a room. One or more of the control devices 102 can include or represent an air or gas sensor that measures constituents in the air, such as the presence of carbon monoxide, natural gas, or the like.

One or more of the control devices 102 can include or represent an accelerometer that detects or measures vibrations or accelerations along one or more directions. A control device 102 can include or represent a position sensor, such as a global positioning system receiver, a wireless triangulation device, etc., for determining geographic locations of the control device 102. One or more of the control devices 102 can include or represent an optical sensor that measures the spectral content of one or more lights (e.g., generated by the lighting device 104). Optionally, the control devices 102 can perform one or more other functions.

The control devices 102 can change the state of the lighting device 104 based on an environment or environmental conditions. For example, the control devices 102 can activate the lighting device 104 responsive to an input signal indicating a detection of motion, can activate the lighting device 104 responsive to detection of a low level of ambient light, or the like. The control devices 102 can represent hardware circuitry that controls operation of the lighting device 104 in another, different way based on inputs (e.g., signals) received from one or more other devices (described below). For example, the control device 102 can activate the lighting device 104 responsive to an input signal received from an electronic device through one or more computer communication networks 114. Alternatively, one or more of the control devices 102 can perform another, different function.

One or more of the control devices 102 may not be able to perform the functions of one or more other control devices 102. Optionally, at least one of the control devices 102 may be configured (e.g., programmed) to perform different sets of functions, but at least one set of the functions may not be available to at least one of the control devices 102 based on the operational state or mode of the control devices 102.

The assembly 100 also includes switching hardware 116 that is actuated to change an operational mode of the system 100. The switching hardware 116 includes hardware circuitry that includes and/or is connected with one or more computer processors 120 (e.g., one or more than one microprocessor, field programmable gate array, microcontroller, integrated circuit, etc.) that change operational modes of the system 100. The processor(s) 120 optionally can be referred to as a controller. In one embodiment, the switching hardware 116 and the control devices 102 are implemented in separate devices (e.g., separate circuitry and/or housings). Alternatively, the switching hardware 116 and the control device 102s are implemented in the same device (e.g., at least some of the same circuitry and/or housing).

The switching hardware 116 includes at least one switch 118, which represents a mechanical, electrical, electro-mechanical, and/or software-based device that is actuated to change the operational mode of the system 100. For example, the switch 118 can include a button, lever, toggle, software application, or the like, that is actuated by a user or operator of the system 100 to change the operational mode of the system 100 (and, therefore, the set of functions that the system 100 can perform). As described herein, changing the operational mode of the system 100 also changes which set of functions that the control devices 102 are able to perform. The switching hardware 116 can be coupled with the control devices 102 by one or more wired connections, one or more wireless connections, or a combination of one or more wired connections and one or more wireless connections.

In one embodiment, the switch 118 is configured to ensure that the operational mode of the system 100 is only altered responsive to an intentional actuation of the switch 118. For example, the switch 118 may only change the operational mode of the system 100 (e.g., by sending an electric signal to one or more of the control devices 102 or to the processors 120, which then send a signal to the one or more control devices 102) responsive to a user manually actuating the switch 118. As another example, the switch 118 can provide a signal to the processors 120 indicating actuation of the switch 118, and the controller 120 access a list, database, table, or other memory structure that identifies approved persons in a memory 122 of the switching hardware 116. The memory 122 can be a tangible and non-transitory computer readable storage medium, such as a computer hard drive, flash drive, optical disk, or the like.

The switching hardware 116 optionally includes one or more sensors 130 that monitor one or more characteristics of an environment. The sensors 130 can be similar or identical to one or more sensors included in and/or represented by the control devices 102. For example, the sensors 130 can include movement sensors, light sensors, temperature sensors, accelerometers, humidity sensors, etc., that measure characteristics of an area as described above. Based on these characteristics, the controller 120 of the switching hardware 116 can automatically actuate the switch 118 and change the operational mode of the system 100. For example, the controller 120 can receive signals from the sensor 130 indicating the measured characteristics and, responsive to the sensors 130 detecting motion, detecting the presence of a person in a room, detecting a change in light, detecting a change in temperature, etc., the controller 120 can send a signal to the switch 118 to automatically change the operational mode of the system 100.

The person actuating the switch 118 may be queried by the controller 120 (e.g., via an output device such as a display) for identifying information. Responsive to receiving identifying information from the person who actuated the switch 118 (e.g., a login and password combination, or another identification of the person), the controller 120 can compare the received identifying information with the information that identifies approved persons to determine if the person providing the identifying information is an approved person. If there is a match in this information, then the controller 120 can send a signal to one or more of the control devices 102 to change the operational mode of the system 100 and change which functions can be performed by the control devices 102. If there is not a match, however, the controller 120 does not send such a signal and the operational mode is not changed.

Changing the operational mode of the system 100 alters which set of functions can be performed by the control devices 102. For example, in a first operational mode, only the functions associated with the control device 102A may be performed. This can include turning the lighting device 104 on or off, and/or dimming the light generated by the lighting device 104. In a different, second operational mode, the functions associated with the control device 102A and the functions associated with the control device 102B can be performed. For example, the control device 102B can automatically control activation or deactivation of the lighting device 104 responsive to one or more characteristics being sensed by one or more of the control devices 102.

The operational mode of the system 100 can be changed to enable the control device 102C to perform the functions associated with the control device 102C. The functions performed by the enabled control device 102C can be different than any or all of the functions performed by the other control devices 102A, 102B. In one example, the control device 102C can allow for networked communication with one or more other devices. The control device 102C can at least partially represent communication hardware, such as one or more antennas, transceivers, transmitters, modems, etc. Optionally, the control device 102C can communicate signals with a control unit 126, with one or more networked electronic devices 128, and/or with one or more other devices, assemblies, or systems.

The control device 102C can communicate via or through one or more of the computer communication networks 114, such as the Internet, a local area network, another wide area network, another network, or a combination thereof. Optionally, the control device 102C can communicate with the control unit 126 via or through one or more of the networks 114 to coordinate operation of the lighting device 104 with one or more other devices 128. The control unit 126 can represent hardware circuitry that includes and/or is connected with one or more computer processors, such as a computer, mobile phone, tablet computer, or the like. The control unit 126 can receive a signal from the control device 102C, can receive a signal from one or more of the networked devices 128, and/or can receive a signal from another source.

In one embodiment, the control unit 126 and/or networked devices 128 represent a lighting control network that remotely controls operation of lighting devices using wired analog control, wired digital control, and/or wireless control, such as through the network(s) 114. The network(s) 114 can include one or more networks of a variety of different types of networks, such as peer-to-peer communication networks, hub networks, cloud-based networks, etc. The control unit 126, devices 128, and/or system 100 can send and/or receive information with each other via the network(s) 114.

The networked devices 128 represent hardware circuitry that performs one or more operations and that can communicate with each other and/or other devices via the network(s) 114. For example, the networked devices 128 can be additional lighting devices 104 (having the functionality of the module 110 enabled), mobile phones, computers, tablet computers, smart home devices (e.g., AMAZON ECHO, GOOGLE HOME, wireless security cameras, NEST thermostat, etc.), or the like. The signals sent to the control unit 126 can indicate statuses of the devices 104, 128 (e.g., whether the devices 104, 128 are on, off, or other states) and/or characteristics that are monitored by the devices 104, 128 (e.g., detection of motion, measured ambient light levels, measured temperatures, detected sounds or voiced instructions to turn devices 104, 128 on or off, etc.). Based on the received signals, the control unit 126 can remotely control one or more of the devices 104, 128.

For example, the control unit 126 can determine whether lighting devices 104, 128 in different locations of a large room, building, etc., are on or off based on signals received from the lighting devices 104, 128. The control unit 126 can determine whether some event occurs (e.g., motion is detected, the ambient light has decreased, etc.) from one or more of the control devices 102 based on the received signals. The control unit 126 can then turn lighting devices 104, 128 on or off based on the received signals. As one example, instead of separate motion control devices 102 coupled with different lighting devices 104, 128 individually controlling which lighting devices 104, 128 are on or off, the control unit 126 can receive signals from one or more of the control devices 102 and turn groups or all of the lighting devices 104, 128 on based on the received signals. This can prevent different lights in different locations of a large room turning on as a person moves through the room while other lights remain off. Instead, the control unit 126 can uniformly turn all or significant portion of the lighting devices 104, 128 on based on the detected motion, even if some or many of the lighting devices 104, 128 are not near the detected motion. Optionally, the devices 104, 128 can communicate with each other directly (e.g., not through or via the control unit 126) to coordinate operations of the devices 104, 128.

The control unit 126 can control operation other than illumination of one or more of the devices 128 based on the signal received from the control device 102C of the lighting device 104 and/or one or more other control devices 102. For example, responsive to receiving a signal indicating that the lighting device 104 is turned on, that motion was detected, and/or that the ambient light level has changed, the control unit 126 can send a signal to a device 128 (e.g., a garage door opener, a thermostat, etc.) to remotely control operation of the device 128 (e.g., open or close the garage door, change a temperature in a room, etc.).

In one embodiment, the switching device 116 can change the operational mode of the system 100 to a mode that involves a first control device 102A controlling the lighting device 104 based on characteristics or information that is sensed by a sensor of the first control device 102A, but without information received via the network(s) 114. For example, this operational mode can provide for the lighting device 104 to be activated, deactivated, dimmed, etc., based on information sensed by the control device 102A, but not based on any information received via the network(s) 114. The switching device 116 can be actuated to activate a different, second control device 102B, which allows the lighting device 104 to be activated, deactivated, dimmed, etc., based on information sensed received via the network(s) 114 (e.g., using the second control device 102B), but not based on information or characteristics sensed by a sensor of the first control device 102A. Optionally, the switching device 116 can be actuated to activate the second control device 102B to allow the lighting device 104 to be activated, deactivated, dimmed, etc., based on information sensed received via the network(s) 114 (e.g., using the second control device 102B) and/or based on information or characteristics sensed by a sensor of the first control device 102A.

Figure 2:
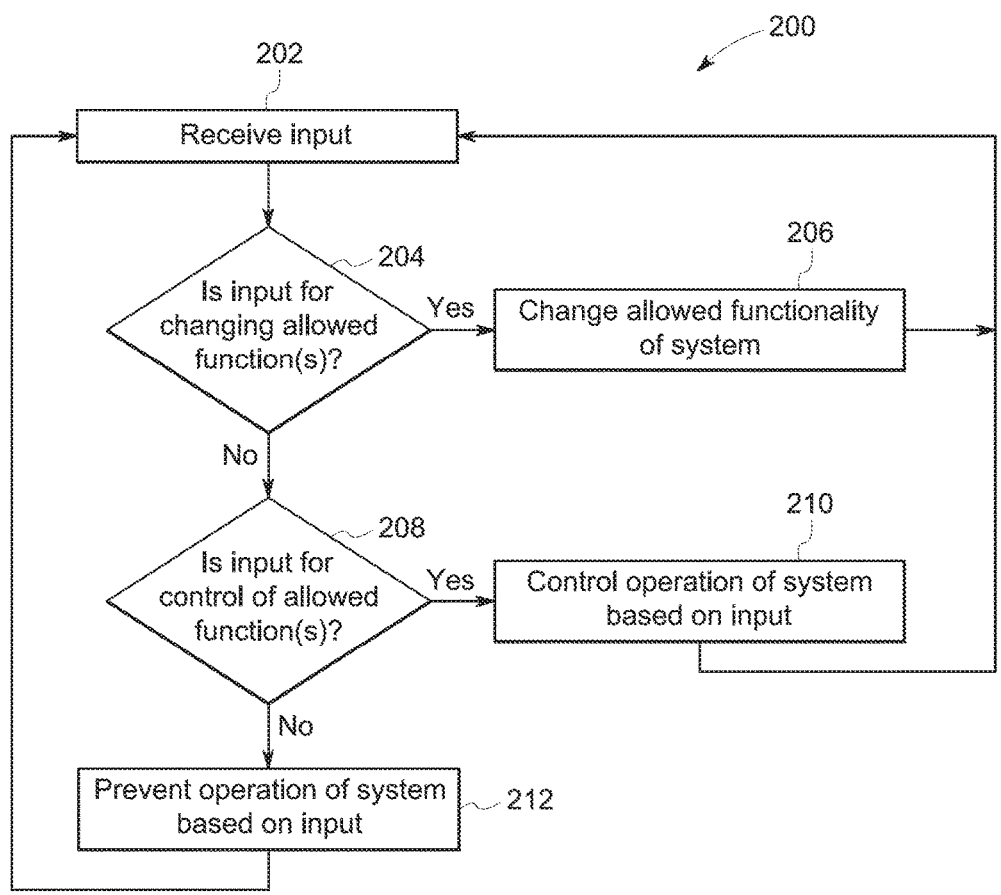
FIG. 2 illustrates a flowchart of one embodiment of a method for user-activated selection of control functionality.

FIG. 2 illustrates a flowchart of one embodiment of a method 200 for user-activated selection of control functionality. The method 200 can represent operations performed by the system 100 shown in FIG. 1. Optionally, the method 200 can represent an algorithm that can be referenced by a person of ordinary skill in the art to create software code for directing the operations of the system 100. At 202, input is received. The input can be received by the controller 120 of the switching hardware 116. This input can be actuation of the switch 118 of the switching hardware 116, can be a signal received from the control unit 126 and/or another device 128, or another signal.

At 204, a determination is made as to whether the input that was received is seeking to change the functions that the system 100 is able to perform. The controller 120 can examine the received input to determine if the input represents an intentional or otherwise non-accidental or non-malicious action to expand or contract the range of functions that the system 100 can perform. For example, the controller 120 can determine if a user actuated the switch 118 to activate one or more additional control devices 102 to increase the set(s) of functions that the system 100 is able to perform. If the input does seek to change the set of functions that the system 100 is able to perform, then flow of the method 200 can proceed toward 206. Otherwise, the input may not seek to change the set of functions that the system 100 is able to perform. As a result, flow of the method 200 can proceed toward 208.

At 206, the functionality that the system 100 is allowed to perform is changed. For example, input seeking to expand the functionality of the system 100 can be used by the control unit 126 to activate one or more of the control devices 102 associated with the expanded functionality. This will allow the system 100 to perform the functions within the set of expanded functions. As another example, input seeking to reduce the functionality of the system 100 can be used by the control unit 126 to deactivate one or more of the control devices 102 associated with the reduced functionality. This will prevent the system 100 from performing the functions within the set of reduced functions. Flow of the method 200 can then return to 202 or optionally terminate.

At 208, a determination is made as to whether the received input is for control of an allowed function of the system 100. The control unit 126 can examine the input to determine what action(s) the input seeks to cause the system 100 or another device 128 to perform. The control unit 236 determines if this action or set of actions are within the scope of the allowed functions of the system 100. If the action or set of actions are within the set of allowed functions performed by the activated control devices 102 of the system 100, then flow of the method 200 can proceed toward 210. But, if the action or set of actions are not within the set of allowed functions performed by the activated control devices 102 of the system 100, then flow of the method 200 can proceed toward 212.

At 210, the action(s) sought to be performed by the input are performed. The control unit 126 can send a signal to the appropriate control device 102 associated with the action that directs the control device 102 to perform the action. Flow of the method 200 can then return to 202 or optionally terminate.

At 212, the action(s) sought to be performed by the input are not performed. The control unit 126 can disregard the input or otherwise not send a signal to a control device 102 that is associated with the selected action. This can prevent the control device 102 from performing the action. Flow of the method 200 can then return to 202 or optionally terminate.

In one embodiment, a lighting control system includes two or more control devices each configured to be coupled with one or more lighting devices. Each of the control devices includes one or more sensors configured to measure a characteristic of an environment, and hardware circuitry configured to connect with a network for one or more of remotely controlling operation of the one or more lighting devices, communicating the characteristic that is sensed, or monitoring information received through the network. The hardware circuitry of the control devices are configured to operate between different operational modes to perform different functions to control the one or more lighting devices based on the characteristic that is measured by the one or more sensors, based on the information received via the network, or based on both the characteristic that is measured and the information received via the network. The system also includes switching hardware configured to change the operational mode of the control devices.

Optionally, the one or more sensors are configured to measure the characteristic as one or more of occupancy of an area by a person or object, presence of the area by the person or object, daylight, ambient light, audible noise, temperature, humidity, composition of air, vibration, acceleration, position, or spectral content.

Optionally, the hardware circuitry of the control devices are configured to connect with the network that controls operation of the one or more lighting devices using one or more of wired analog control, wired digital control, or wireless control.

Optionally, the hardware circuitry of the control devices are configured to connect with the network that includes one or more of a peer-to-peer network, a hub network, or a cloud based network.

Optionally, each of the control devices includes a separate assembly of the hardware circuitry that is configured to separately perform a different function than the other control devices.

Optionally, the switching hardware is configured to be wirelessly connected with the two or more control devices.

Optionally, the switching hardware is configured to automatically change the operational mode of the control devices based on the characteristic that is measured.

Optionally, the switching hardware is configured to only change the operational mode of the control devices responsive to manual actuation of the switching hardware.

Optionally, the control devices and the one or more lighting devices are separate hardware entities that are connected via one or more wired or wireless connections.

In one embodiment, a system includes control devices each configured to be coupled with one or more lighting devices. Each of the control devices is configured to switch between operational modes that include a first operational mode involving receiving a characteristic measured by one or more sensors, a second operational mode involving connecting with a computer network for remotely controlling operation of the one or more lighting devices, and a third operational mode involving both receiving the characteristic that is measured by the one or more sensors and remotely controlling the operation of the one or more lighting devices based on the characteristic that is measured. The system also includes switching hardware configured to change the operational mode of the control devices.

Optionally, the control devices are configured to operate in both the first and second operational modes but is prevented from operating in the second operational mode by the switching hardware while operating in the first operational mode.

Optionally, the control devices are configured to implement manual control of illumination of one or more locations by the one or more lighting devices in the first operational mode. The control devices can be configured to automatically control the illumination of the one or more locations by the one or more lighting devices in the second operational mode.

Optionally, the control devices are configured to control of illumination of one or more locations by the one or more lighting devices while in the first operational mode and the control devices are configured to control a function other than the illumination of the one or more locations while in the second operational mode.

Optionally, the control devices are configured to implement manual control of illumination of one or more locations by the one or more lighting devices while operating in the first operational mode. The control devices can be configured to monitor one or more characteristics of an environment in which the one or more lighting devices are located while operating in the second operational mode.

Optionally, the control devices are configured to implement manual control of illumination of one or more locations by the one or more operational modes while operating in the first operational mode. The control devices can be configured to communicate with a back-end control unit for remotely controlling operation of the one or more lighting devices while operating in the second operational mode.

Optionally, the control devices are configured to implement manual control of illumination of one or more locations by the one or more lighting devices while operating in the first operational mode. The control devices can be configured to communicate with circuitry of one or more other lighting devices while operating in the second operational mode.

In one embodiment, a method includes controlling one or more functions in a first set of functions using circuitry of an assembly, determining whether switching hardware has been intentionally actuated to change an operational mode of the circuitry from a first operational mode to a different, second operational mode, and controlling one or more different functions in a different, second set of functions using the circuitry of the assembly responsive to determining that the switching hardware has been intentionally actuated. The circuitry is configured to perform only the first set of functions while in the first operational mode and the circuitry is configured to perform both the first and second set of functions while in the second operational mode.

Optionally, the circuitry is capable of performing the first and second set of functions in both the first and second operational modes. The method also can include preventing the circuitry from performing the second set of functions while operating in the first operational mode.

Optionally, the one or more functions in the first set of functions include implementing manual control of illumination of one or more locations by a light device, and wherein the one or more functions in the second set of functions include automatic control of the illumination of the one or more locations by the light device.

Optionally, the one or more functions in the second set of functions include detecting motion and automatically controlling the illumination of the one or more locations by the light device responsive to detecting the motion.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A lighting control system comprising:
two or more control devices each configured to be coupled with one or more lighting devices and that each include:
(a) one or more sensors configured to measure a characteristic of an environment, and
(b) hardware circuitry configured to connect with a network for one or more of remotely controlling operation of the one or more lighting devices, communicating the characteristic that is sensed, or monitoring information received through the network,
wherein the hardware circuitry of the control devices are configured to operate between different operational modes to perform different functions to control the one or more lighting devices based on the characteristic that is measured by the one or more sensors, based on the information received via the network, or based on both the characteristic that is measured and the information received via the network; and
hardware circuitry configured to change the operational mode of the control devices.

2. The lighting control system of claim 1, wherein the one or more sensors are configured to measure the characteristic as one or more of occupancy of an area by a person or object, presence of the area by the person or object, daylight, ambient light, audible noise, temperature, humidity, composition of air, vibration, acceleration, position, or spectral content.

3. The lighting control system of claim 1, wherein the hardware circuitry of the control devices are configured to connect with the network that controls operation of the one or more lighting devices using one or more of wired analog control, wired digital control, or wireless control.

4. The lighting control system of claim 1, wherein the hardware circuitry of the control devices are configured to connect with the network that includes one or more of a peer-to-peer network, a hub network, or a cloud based network.

5. The lighting control system of claim 1, wherein each of the control devices includes a separate assembly of the hardware circuitry that is configured to separately perform a different function than the other control devices.

6. The lighting control system of claim 1, wherein the hardware circuitry is configured to be wirelessly connected with the two or more control devices.

7. The lighting control system of claim 1, wherein the hardware circuitry is configured to automatically change the operational mode of the control devices based on the characteristic that is measured.

8. The lighting control system of claim 1, wherein the hardware circuitry is configured to only change the operational mode of the control devices responsive to manual actuation of the hardware circuitry.

9. The lighting control system of claim 1, wherein the control devices and the one or more lighting devices are separate hardware entities that are connected via one or more wired or wireless connections.

10. A system comprising:
control devices each configured to be coupled with one or more lighting devices, each of the control devices configured to switch between operational modes that include a first operational mode involving receiving a characteristic measured by one or more sensors, a second operational mode involving connecting with a computer network for remotely controlling operation of the one or more lighting devices, and a third operational mode involving both receiving the characteristic that is measured by the one or more sensors and remotely controlling the operation of the one or more lighting devices based on the characteristic that is measured; and
hardware circuitry configured to change the operational mode of the control devices.

11. The system of claim 10, wherein the control devices are configured to operate in both the first and second operational modes but is prevented from operating in the second operational mode by the hardware circuitry while operating in the first operational mode.

12. The system of claim 10, wherein the control devices are configured to implement manual control of illumination of one or more locations by the one or more lighting devices in the first operational mode, and wherein the control devices are configured to automatically control the illumination of the one or more locations by the one or more lighting devices in the second operational mode.

13. The system of claim 10, wherein the control devices are configured to control of illumination of one or more locations by the one or more lighting devices while in the first operational mode and the control devices are configured to control a function other than the illumination of the one or more locations while in the second operational mode.

14. The system of claim 10, wherein the control devices are configured to implement manual control of illumination of one or more locations by the one or more lighting devices while operating in the first operational mode, and wherein the control devices are configured to monitor one or more characteristics of an environment in which the one or more lighting devices are located while operating in the second operational mode.

15. The system of claim 10, wherein the control devices are configured to implement manual control of illumination of one or more locations by the one or more operational modes while operating in the first operational mode, and wherein the control devices are configured to communicate with a back-end control unit for remotely controlling operation of the one or more lighting devices while operating in the second operational mode.

16. The system of claim 10, wherein the control devices are configured to implement manual control of illumination of one or more locations by the one or more lighting devices while operating in the first operational mode, wherein the control devices are configured to communicate with circuitry of one or more other lighting devices while operating in the second operational mode.

17. A method comprising:
controlling one or more functions in a first set of functions using circuitry of an assembly;
determining whether hardware circuitry has been intentionally actuated to change an operational mode of the circuitry from a first operational mode to a different, second operational mode; and
controlling one or more different functions in a different, second set of functions using the circuitry of the assembly responsive to determining that the hardware circuitry has been intentionally actuated, wherein the circuitry is configured to perform only the first set of functions while in the first operational mode and the circuitry is configured to perform both the first and second set of functions while in the second operational mode.

18. The method of claim 17, wherein the circuitry is capable of performing the first and second set of functions in both the first and second operational modes, and wherein the method also includes preventing the circuitry from performing the second set of functions while operating in the first operational mode.

19. The method of claim 17, wherein the one or more functions in the first set of functions include implementing manual control of illumination of one or more locations by a light device, and wherein the one or more functions in the second set of functions include automatic control of the illumination of the one or more locations by the light device.

20. The method of claim 19, wherein the one or more functions in the second set of functions include detecting motion and automatically controlling the illumination of the one or more locations by the light device responsive to detecting the motion.

* * * * *